Sept. 15, 1953     E. L. VENSTROM     2,651,919
ROTARY HYDRAULIC COUPLING
Filed Aug. 12, 1949     2 Sheets-Sheet 2
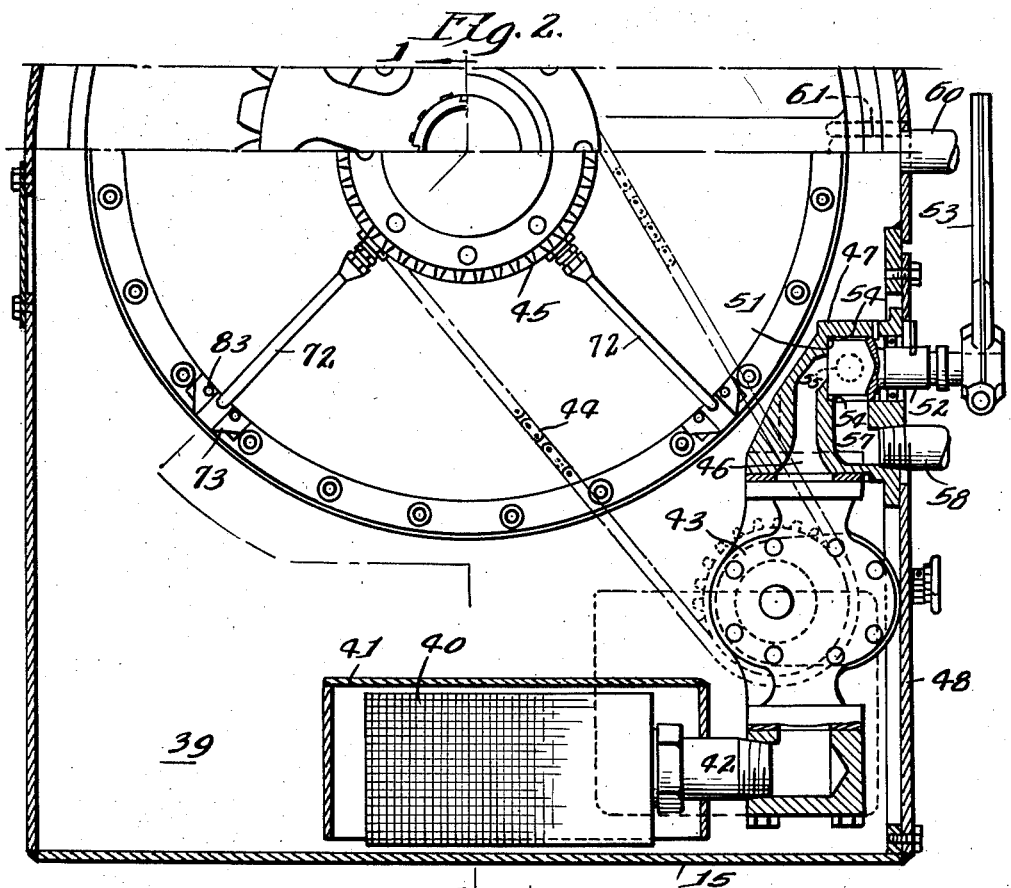
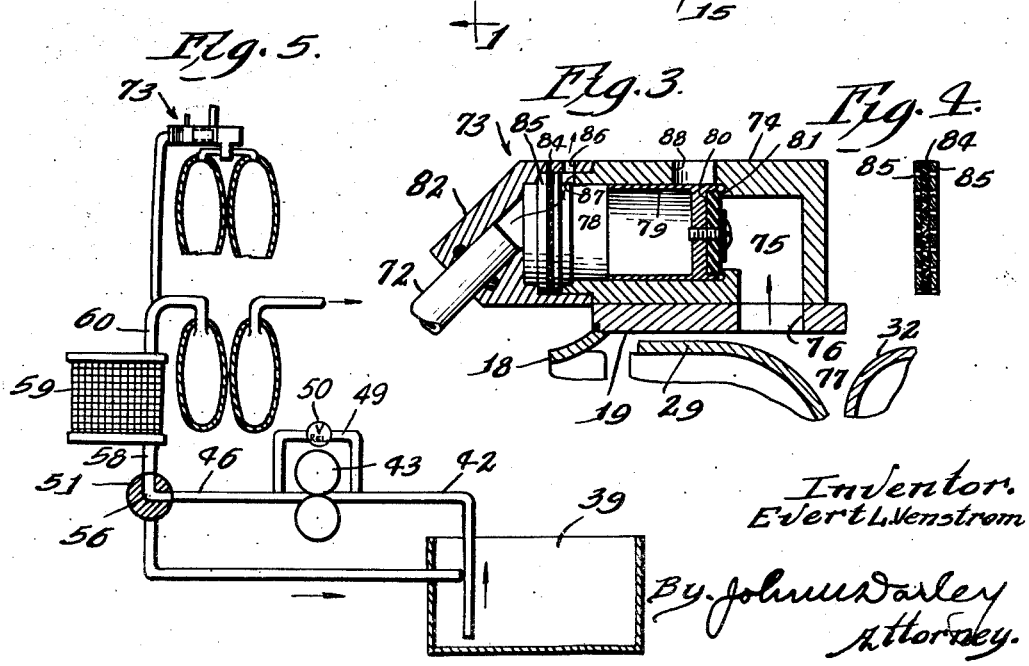
Inventor.
Evert L. Venstrom
By John W. Darley
Attorney.

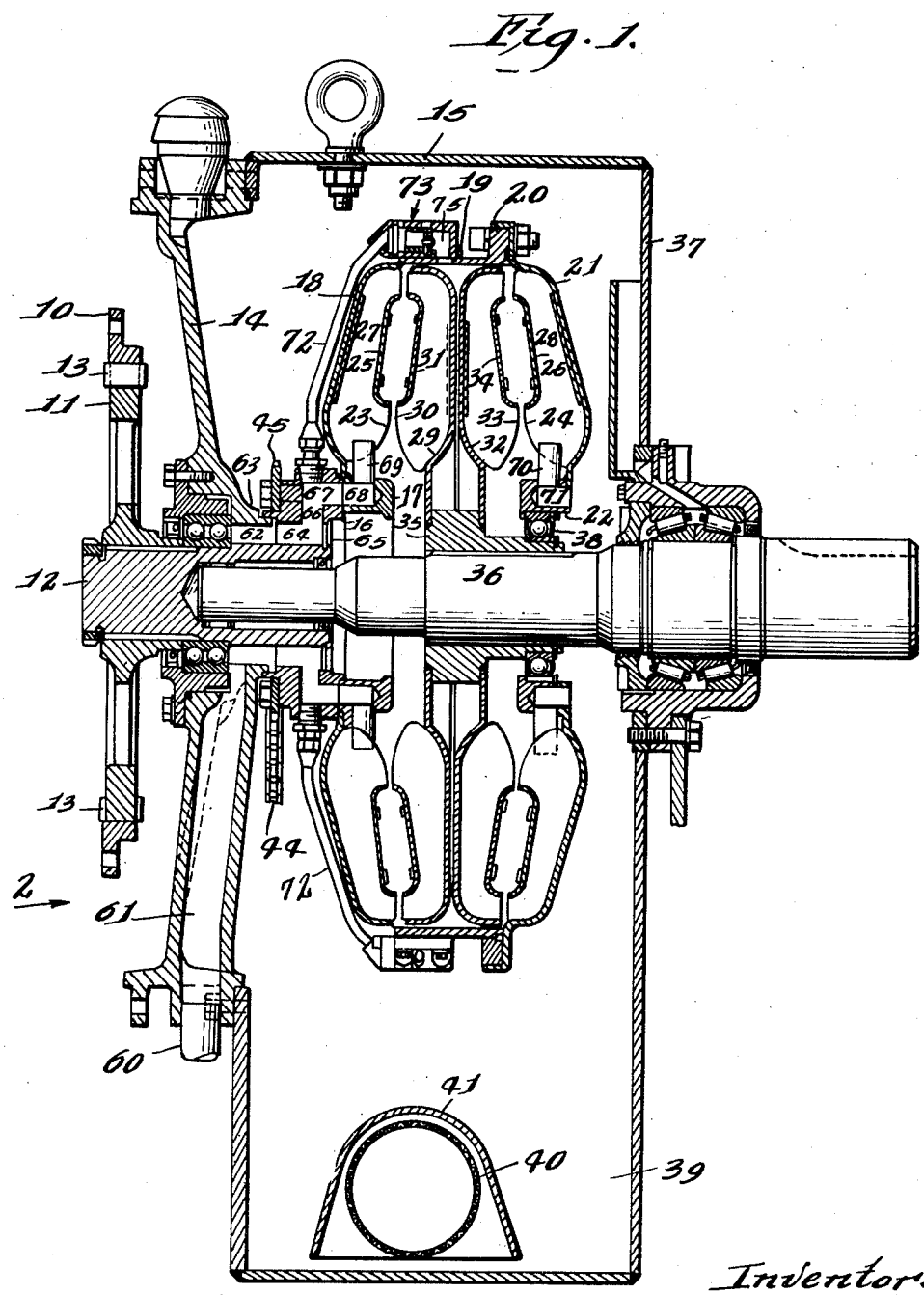

Patented Sept. 15, 1953

2,651,919

UNITED STATES PATENT OFFICE 2,651,919

ROTARY HYDRAULIC COUPLING

Evert L. Venstrom, Rockford, Ill., assignor to Twin Disc Clutch Company, Racine, Wis., a corporation of Wisconsin Application August 12, 1949, Serial No. 109,973

7 Claims. (Cl. 60—54)

My invention relates to rotary hydraulic couplings and more particularly to a unit in which power transmission therethrough can be established or interrupted by filling or emptying the coupling.

Couplings of this general type are broadly old and they possess the advantage of enabling the driven machine to be stopped without disturbing the driving machine or source of power and of placing in operation a driven machine requiring a high starting torque. Such a unit therefore has clutching characteristics while exhibiting the usual advantages of a hydraulic coupling during periods of power transmission. Efficient operation of these devices requires a rapid filling and emptying of the coupling.

It is therefore one object of my invention to devise a coupling of the character indicated equipped with external dump valves that function under conditions of pressure unbalance, the valves occupying one position during filling and another during emptying.

A further object is to provide a screening device, easily accessible for cleaning which prevents clogging of the bleed ports associated with the dump valves and sticking of the valves.

A further object is to devise a coupling which is interiorly constructed to facilitate filling or emptying of the coupling with the runner stalled.

These and further objects of my invention will be set forth in the following specification, reference being had to the accompanying drawings and the novel means by which said objects are effectuated will be definitely pointed out in the claims.

In the drawings:

Fig. 1 is a sectional elevation of the coupling as viewed along the line 1—1 in Fig. 2.

Fig. 2 is a fragmentary end view, partly in section, looking in the direction of the arrow 2 in Fig. 1.

Fig. 3 is an enlarged section of one of the dump valves as it appears in the upper part of Fig. 1.

Fig. 4 is an enlarged section of a valve strainer.

Fig. 5 is a schematic layout of a hydraulic pressure system forming part of the coupling.

Referring to Fig. 1, the numeral 10 designates a driving ring which is connectible to an engine flywheel or other source of power and is internally toothed for driving engagement with a spider 11 that is keyed to an input shaft 12. Each tooth on the spider 11 may be encased in a rubber sleeve 13 to cushion the drive and compensate for minor axial misalignments between the flywheel and coupling assembly. The shaft 12 is journaled in an end wall 14 forming part of a housing 15 which encloses the coupling while inwardly of the wall 14 the shaft is flanged at 16 and attached to the inner face of this flange is a ring 17, all for purposes presently explained.

The inner rim of an impeller 18 is welded to the ring 17 while the outer rim is welded to one end of a spacer ring 19 whose opposite end is outwardly flanged at 20 for sealable connection with the outer rim of an impeller 21 that is located in facing relation to the impeller 18. The inner rim of the impeller 21 is welded to a ring 22. The impellers 18 and 21 are provided with the usual blades 23 and 24 and core rings 25 and 26 that define a plurality of radial passages 27 and 28, all respectively.

A runner 29 having radial blades 30 and a core ring 31 is located in facing and cooperating relation to the impeller 18 and a similar runner 32 having radial blades 33 and a core ring 34 is positional in facing and cooperating relation to the impeller 21, thus forming a pair of liquid working circuits.

The inner peripheries of the runners 29 and 32 are welded or otherwise attached to a hub 35 that is keyed to an output shaft 36 whose right end is journaled in the other end wall 37 of the housing 15 and extends outwardly thereof for connection to a load. The opposite end of the shaft is piloted within the inner end of the input shaft 12. The hub 35 carries a bearing 38 for journal support of the ring 22.

The twin circuit coupling forms part of a hydraulic system which is controlled to effect the filling or emptying of the coupling as desired. The lower part of the housing 15 serves as a sump 39 for the working oil and submerged within the sump is a cylindrical strainer 40 that is partially surrounded by a shield 41 spaced therefrom, the strainer and shield being carried by a pipe 42 leading to a gear pump 43 that is suitably mounted within the housing 15 and drivably connected by a chain 44 with a sprocket 45 attached to the input shaft flange 16.

The discharge from the pump 43 is delivered to one end of a passage 46 provided in a casing 47 (see Fig. 2) suitably mounted on the inner face of a side wall 48 of the housing 15. Bridged around the pump 43 is a bypass 49 (see Fig. 5) which includes a pressure relief valve 50 for preventing excessive pressures in the system. The opposite end of the passage 46 communicates with the open end of a hollow control valve 51 which is rotatably mounted in the casing 47 and carried on the inner end of a stem 52 that extends through the wall 48 and has fastened thereto an operating handle 53.

A pair of diametrally related ports 54—54 are provided in the annular wall of the valve 51 and another pair of diametrally related ports 55—55 displaced 90° from the ports 54, when the valve occupies the position shown in Fig. 2, extend through the wall of the casing 47, only one of the ports 55 being shown in the drawing. When the valve 51 is rotated 90° from the position shown in Fig. 2, each port 54 registers with a port 55, and the interior of the valve then communicates with the interior of the housing 15 and hence with the sump 39. For simiplicity in illustration, the hollow interior of the valve 51 is indicated as an L-shaped passage 56 in the schematic Fig. 5 view.

When the valve 51 is in the position shown in Fig. 2, the upper port 54 is masked by the casing 47, but the other port 54 registers with one end of a passage 57 in the casing and the opposite end of this passage communicates with one end of a pipe 58 which connects with a cooler 59 (see Fig. 5). The cooler in turn connects by way of a pipe 60 with the outer end of a passage 61 provided in the housing end wall 14. The inner end of the passage 61 communicates with an annular passage 62 included between the surface of the shaft 12 inward of the wall 14 and an annular inward flange 63 formed on this wall and which is overlapped by the adjacent end of the shaft flange 16 as indicated in Fig. 1. For ease in illustration the passage 61 is shown as in Fig. 1, but actually this passage is positioned on the horizontal center line of the coupling as shown in Fig. 2.

The passage 62 constantly communicates with the adjacent ends of a plurality of passages 64 which extend transversely of the flange 16 and are circumferentially spaced around the shaft 12. The opposite ends of the passages 64 are closed by plugs 65 and adjacent thereto connect through radial passages 66 with the ends of radially outward passages 67, respectively, the last named passages being circumferentially spaced around the flange 16. The passages 67 are therefore radially offset from the passages 64 and each of the former communicates with a pocket 68 in the ring 17. Carried by the ring 17 and extending radially outward thereof is a series of circumferentially spaced tubes 69 whose inner ends communicate with the pockets 68, respectively, and whose outer ends project within the inner ends of selected passages 27 of the impeller 18. Similar tubes 70, carried by the ring 22, project within selected passages 28 of the impeller 21 and their inner ends communicate, respectively, with pockets 71 circumferentially spaced around the ring 22 and which communicate with the interior of the housing 15 and therefore with the sump 39. The number of passages 64, 66, and 67, pockets 68 and 71, and tubes 69 and 70 may be varied as desired, the tubes being employed for a purpose presently explained.

A plurality of circumferentially spaced pipes 72 extend wholly outward of the exterior of the impeller 18, their inner ends communicating, respectively, with the passages 67 and each of their outer ends with a dump valve 73 carried by the spacer ring 19. The dump valve is more specifically illustrated in Fig. 3 to which reference will now be made. It comprises a casing 74 having at one end a chamber 75 which communicates through a port 76 in the ring 19 with a space 77 included between the ring and the outer ends of the runners 29 and 32. Accordingly, the chamber 75 is always in communication with the interior of the coupling.

The chamber 75 also communicates under certain conditions presently noted with a cylindrical chamber 78 in which is slidable a piston valve 79 having on the head thereof a packing washer 80 which, in the position of parts shown in Fig. 3, abuts an annular shoulder 81 formed by the junction of the chambers 75 and 78 and prevents communication between the chambers. As clearly indicated in Fig. 3, the area of the valve 79 which is exposed in the chamber 75 is less than the area exposed in the chamber 78 for a purpose presently explained. The left end of the casing 74, as viewed in Fig. 3, is closed by a cover 82 which fits over the casing end and is secured thereto by cap screws 83 (see Fig. 2) and through which extends in sealing relation the outer end of the associated pipe 72. Oil passing through this pipe is filtered by passage through a screen 84 which is abutted in opposite sides by perforated plates 85—85 (see Fig. 4), the assembly comprising the screen and plates being clamped between the cover 82 and the adjacent end of the casing 74. On the delivery side of the screen assembly, a bleed orifice 86 is provided in the cover 82 which registers with a slot 87 cut in the adjacent end of the casing 74, thus providing a constant means of communication between the chamber 78 and the interior of the housing 15. An outlet or dumping port 88 is provided in the wall of the casing 74 which, in the position of parts illustrated in Fig. 3, is masked by the valve 79, but is uncovered under conditions presently explained to connect the chamber 75 and hence the interior of the coupling with the sump 39.

When power is being transmitted through the coupling, the several parts occupy the positions shown in the drawings. Expressed in detail, the control valve 51 is positioned as in Fig. 5 and since the impellers 18 and 21 are being driven by the engine, the pump 43 maintains a continuous circuit of the working oil. This oil is withdrawn from the sump 39, forced through the cooler 59 and thence through the pipe 60, passages 61, 62, 64, 66 and 67, pockets 68 and tubes 69 into the twin circuits of the coupling which is thus maintained in a filled condition. The overflow from the coupling is effected through the tubes 70 and pockets 71 to the sump 39. A portion of the oil is deflected outwardly through the radial pipes 72 and through the screen 84 into the chamber 78 so that its pressure acts against the adjacent side of the valve 79, and the pressure of the oil within the coupling is also effective through the port 76 and against that part of the valve 79 which is exposed in the chamber 75. Since these unit pressures are equal, the area differential between opposite sides of the valve 79 results in the latter being positioned so that it masks the dumping port 88. There is a constant discharge of oil through the bleed orifice 86, but this opening is restricted so that it does not affect the valve position as noted under the indicated conditions of operation.

To dump the coupling and hence interrupt power transmission, the engine continuing to operate and to rotate the impellers 18 and 21, the valve 51 is rotated 90° to connect the passage 46 with the ports 55 (see Fig. 2) so that the pump 43 returns the oil directly to the sump 39. The oil in the pipes 72 bleeds through the orifices 86 in from one to three seconds, approximately, thus relieving that hydraulic pressure which has hitherto held the valves 79 in masking relation to the dumping ports 88. The hydraulic pressure within the coupling, acting through the ports 76, then shifts each valve 79 towards the left, as viewed in Fig. 3, thus uncovering the ports 88 through which the coupling is emptied. The entire dumping time for a 21″, twin circuit coupling will range approximately from one and one-half to five seconds depending upon the rotating speed of the coupling and the temperature of the oil.

To fill the coupling, the valve is turned to the position shown in Fig. 5 and the oil fills the pipes 72 before there is any appreciable filling of the coupling. Hence, the valves 79 are shifted to mask the ports 88 and the coupling fills rapidly. After the filling is completed, the valves 79 maintain their masking positions because the total pressure acting to maintain the masked positions of the valves is greater than that acting against the valves in the chambers 75.

The purpose of the tubes 69 and 70 which project within the passages of the impellers 18 and 21 is to facilitate filling and emptying of the coupling when the output shaft 38 is stalled. In this event and assuming a filling operation without the tubes 69 and 70, it was determined that the oil will move radially inwardly of the runner 32 at such a high rate of speed that it flowed directly out of the pockets 71 to the sump 39 so that it was difficult to fill the coupling. Similarly, when it was attempted to empty the coupling with the shaft 36 stalled, the inward flow from the runner 29 forced the oil through the pocket 68, passage 67 and thence radially outwardly through the pipes 72 so that the piston valves 79 would not open even though the pressure created by the pump 43 was diverted to the sump. The tubes 69 and 70 solve this problem by baffling the pockets 68 and 71, respectively, so that during emptying, the tubes 69 direct the oil from the runner 29 into the impeller 18 from where it flows through the port 76 and chamber 75 to become effective against the dump piston valve 79 in an opening direction and, during filling, the tubes 70 direct the oil from the runner 32 into the impeller 21.

The piston valves 79 operate automatically in that their position is determined by the pressure conditions existing at their opposite ends, no springs or levers being required and the movement of the valves being wholly unaffected by centrifugal forces. The screens 84 catch any foreign matter that might otherwise clog the bleed orifice 86 or interfere with the free movement of the valves 79. Further, the screens are reinforced by the abutting plates 86 against distortion by the pressure. The screens are easily removed for cleaning by detaching the covers 82 and slipping the latter off the ends of the pipes 72.

I claim:

1. A hydraulic coupling having driving and driven members each including a plurality of radial passages cooperatively related to form a liquid working circuit, means for supplying liquid to the circuit including inlet ports around the central portion of the coupling at the inlet of the driving member radial passages, dump valve means positioned peripherally around the driving member, the dump valve means including a dumping port for discharging liquid from the coupling and a valve oppositely subjected to the pressure of the supplied liquid and to the liquid pressure within the coupling, the valve being arranged to close the dumping port when subjected to the supplied pressure and to open when the supplied pressure is interrupted, and means for facilitating the emptying of the coupling when the driven member is stalled including baffles extending radially into the working circuit adjacent to and ahead of the inlet ports in the direction of flow for biasing liquid flow from the driven member passages into the driving member passages and away from the inlet ports.

2. A hydraulic coupling having driving and driven members each including a plurality of radial passages cooperatively related to form a liquid working circuit, means for supplying liquid to the circuit including inlet ports around the central portion of the coupling, dump valve means peripherally positioned around the driving member, the dump valve means including a dumping port for discharging liquid from the coupling and a valve oppositely subjected to the pressure of the supplied liquid and to the liquid pressure within the coupling, the valve being arranged to close the dumping port when subjected to the supplied pressure and to open when the supplied pressure is interrupted, and means for facilitating the emptying of the coupling when the driven member is stalled including open end tubes communicating with the inlet ports and extending in a radial direction partially within the passages of the driving member.

3. A hydraulic coupling having driving and driven members each including a plurality of radial passages cooperatively related to form a liquid working circuit, means for supplying liquid to the circuit including inlet ports around the central portion of the coupling, dump valve means positioned peripherally around the driving member, the dump valve means including a dumping port for discharging liquid from the coupling and a valve oppositely subjected to the pressure of the supplied liquid and to the liquid pressure within the coupling, the valve being arranged to close the dumping port when subjected to the supplied pressure and to open when the supplied pressure is interrupted, and means for facilitating the emptying of the coupling when the driven member is stalled including open end tubes communicating with the inlet ports and extending in a radial direction partially within the passages of the driving member a distance sufficient to bias liquid flow from the driven member passages into the driving member passages and away from the inlet ports.

4. A hydraulic coupling comprising connected fore and aft facing impellers and a pair of oppositely facing runners positioned between and cooperatively related to the impellers to form a pair of liquid working circuits including radial passages in the impellers and runners, means for supplying liquid to the circuits including inlet ports around the central portion of the fore impeller at the inlet of the fore impeller passages, the aft impeller having overflow ports located adjacent the inlet ends of the aft impeller passages, dump valve means peripherally positioned around the impellers, the dump valve means including a dumping port for discharging liquid from the coupling and a valve oppositely subjected to the pressure of the supplied liquid and to the liquid pressure within the coupling, the valve being arranged to close the dumping port when subjected to the supplied pressure and to open when the supplied pressure is interrupted, and means for facilitating the emptying or filling of the coupling when the runners are stalled including baffles extending radially into each working circuit adjacent to and ahead of the inlet and overflow ports in the direction of flow, respectively, for biasing away from the inlet ports and into the passages of the fore impeller liquid flow from the associated runner during emptying and for biasing away from the overflow ports and into the passages of the aft impeller liquid flow from the associated runner during filling.

5. A hydraulic coupling comprising connected fore and aft facing impellers and a pair of oppositely facing runners positioned between and cooperatively related to the impellers to form a pair of liquid working circuits including radial passages in the impellers and runners, means for supplying liquid to the circuits including inlet ports around the central portion of one of the impellers at the inlet of said one impeller passages, the other impeller having overflow ports located adjacent the inlet ends of said other impeller passages, dump valve means peripherally positioned around the impellers and including a dumping port for discharging liquid from the coupling and a valve oppositely subjected to the pressure of the supplied liquid and to the liquid pressure within the coupling, the valve being arranged to close the dumping port when subjected to the supplied pressure and to open when the supplied pressure is interrupted, and means for facilitating the emptying or filling of the coupling when the runners are stalled including baffles extending radially into each working circuit adjacent to and ahead of the inlet and overflow ports in the direction of flow, respectively, for biasing away from the inlet ports and into the passages of said one impeller liquid flow from the associated runner during emptying and for biasing away from the overflow ports and into the passages of the said other impeller liquid flow from the associated runner during filling.

6. A hydraulic coupling comprising connected fore and aft facing impellers and a pair of oppositely facing runners positioned between and cooperatively related to the impellers to form a pair of liquid working circuits including radial passages in the impellers and runners, means for supplying liquid to the circuits including inlet ports around the central portion of the fore impeller at the inlet of the fore impeller passages, the aft impeller having overflow ports located adjacent the inlet ends of the aft impeller passages, dump valve means peripherally positioned around the impellers and including a dumping port for discharging liquid from the coupling and a valve oppositely subjected to the pressure of the supplied liquid and to the liquid pressure within the coupling, the valve being arranged to close the dumping port when subjected to the supplied pressure and to open when the supplied pressure is interrupted, and means for facilitating the emptying or filling of the coupling when the runners are stalled including open end tubes communicating with the inlet and overflow ports and extending in a radial direction partially into the working circuits, respectively, for biasing away from the inlet ports and into the passages of the fore impeller liquid flow from the associated runner during emptying and for biasing away from the overflow ports and into the passages of the aft impeller liquid flow from the associated runner during filling.

7. A hydraulic coupling comprising connected fore and aft facing impellers and a pair of oppositely facing runners positioned between and cooperatively related to the impellers to form a pair of liquid working circuits including radial passages in the impellers and runners, means for supplying liquid to the circuits including inlet ports around the central portion of one of the impellers at the inlet of said one impeller passages, the other impeller having overflow ports located adjacent the inlet ends of said other impeller passages, dump valve means peripherally positioned around the impellers and including a dumping port for discharging liquid from the coupling and a valve opositely subjected to the pressure of the supplied liquid and to the liquid pressure within the coupling, the valve being arranged to close the dumping port when subjected to the supplied pressure and to open when the supplied pressure is interrupted, and means for facilitating the emptying or filling of the coupling when the runners are stalled including open end tubes communicating with the inlet and overflow ports and extending in a radial direction partially into the working circuits, respectively, for biasing away from the inlet ports and into the passages of said one impeller liquid flow from the associated runner during emptying and for biasing away from the overflow ports and into the passages of said other impeller liquid flow from the associated runner during filling.

EVERT L. VENSTROM.

References Cited in the file of this patent

UNITED STATES PATENTS

| Number | Name | Date |
|---|---|---|
| 1,910,696 | Kiep | May 23, 1933 |
| 1,937,364 | Sinclair | Nov. 28, 1933 |
| 2,149,369 | Sinclair | Mar. 7, 1939 |
| 2,187,667 | Sinclair et al. | Jan. 16, 1940 |
| 2,223,715 | Berger | Dec. 3, 1940 |
| 2,298,105 | Canaan | Oct. 6, 1942 |
| 2,325,090 | Alison | July 27, 1943 |
| 2,380,074 | Roche | July 10, 1945 |

FOREIGN PATENTS

| Number | Country | Date |
|---|---|---|
| 290,930 | Great Britain | May 24, 1928 |
| 446,530 | Great Britain | Apr. 27, 1936 |